US006719078B2

(12) United States Patent
Nakamura

(10) Patent No.: US 6,719,078 B2
(45) Date of Patent: Apr. 13, 2004

(54) VENTILABLE SILENCER UNIT FOR VEHICLES

(75) Inventor: Masahiro Nakamura, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/980,634

(22) PCT Filed: Mar. 30, 2001

(86) PCT No.: PCT/JP01/02720

§ 371 (c)(1),
(2), (4) Date: Dec. 5, 2001

(87) PCT Pub. No.: WO01/79682

PCT Pub. Date: Oct. 25, 2001

(65) Prior Publication Data

US 2002/0153181 A1 Oct. 24, 2002

(30) Foreign Application Priority Data

Apr. 7, 2000 (JP) ...................................... 2000-105898

(51) Int. Cl.[7] ............................................... B62D 25/10

(52) U.S. Cl. ............................... 180/69.22; 180/69.23; 181/224; 181/226; 293/117; 454/960

(58) Field of Search ............................ 180/69.2, 69.21, 180/69.22, 69.23, 68.1; 181/229, 224, 250, 255, 258, 225, 226, 284; 296/208; 293/117; 454/960

(56) References Cited

U.S. PATENT DOCUMENTS 3,762,489 A * 10/1973 Proksch et al. ............ 180/68.1
3,811,531 A * 5/1974 Forssman ................... 181/258
5,014,816 A * 5/1991 Dear et al. .................. 181/229
5,502,283 A 3/1996 Ukai et al. .................. 181/228
6,009,705 A * 1/2000 Arnott et al. ............... 181/229
6,260,659 B1 * 7/2001 Takahashi et al. .......... 181/255
6,499,956 B2 * 12/2002 Nakamura .................. 181/224

FOREIGN PATENT DOCUMENTS

| | | |
|---|---|---|
| JP | 2-149813 | 12/1990 |
| JP | 5-256120 | 10/1993 |
| JP | 6-76649 | 10/1994 |
| JP | 8-177456 | 7/1996 |
| JP | 2000-85498 | 3/2000 |

* cited by examiner

*Primary Examiner*—Brian L. Johnson
*Assistant Examiner*—Hau Phan
(74) *Attorney, Agent, or Firm*—Staas & Halsey LLP

(57) ABSTRACT

A box type silencer unit includes a ventilation portion, a silencer portion adjacent to the ventilation portion, and a dividing partition located between the ventilation portion and the silencer portion. The ventilation portion is formed of a ventilating passage opened through a front end and a back end of the box body. The silencer portion is formed by closing the front end and the back end of the box body and includes at least one partition plate to make a plurality of silencing passages of different length. Each of the silencing passages communicates with the ventilation passage through at least one opening formed in the dividing partition and at least one of those silencing passages is provided with at least one passage extending partition to extend the length of the silencing passage. This device can be applied to such a portion, e.g., the front grille or bumper of an automobile as cannot take a large area in front of the ventilation or a depth in the ventilating direction.

11 Claims, 11 Drawing Sheets

VENTILABLE SILENCER UNIT FOR VEHICLES

TECHNICAL FIELD

The present invention relates to a ventilable silencer unit and a ventilable silencer device, which have both a ventilating function to ventilate cooling air to the engine of an automobile, for example, and a silencing function to silence the noises to be radiated from the inside of the engine room or the like.

BACKGROUND ART

The noises of the automobile such as a car, a motor truck or an auto bus are coarsely divided into internal ones, to be felt by a driver or passenger, and external ones, to be felt by outside persons. Individual noise controls have been made from the viewpoints of improving the marketability and preventing the noise pollution.

The external noises are coarsely classified according to their sources into engine noises, drive line noises, exhaust line noises and tire noises. On the other hand, these engine noises contain not only the mechanical noises made by the engine body but also intake line noises or cooling fan noises.

Especially in recent years, the problem of external noises has risen, stressing the idle noises of a Diesel engine. Against the sound, as radiated from the engine, of a higher contribution in the external noises, there has been made a control for reducing the external noises by arranging a shielding cover 74 having sound absorbing and shielding characteristics sideways or below an engine 70, as shown in FIG. 14, to absorb or shield the noises to be radiated from the engine block or oil pan.

Where cooling air is taken into a radiator 72 from a ventilating passage 75 of a front grille 73 by a fan 71, however, the noises which are radiated forward of the vehicle from the ventilating passage 75 of the front grille 73 are loud even if the engine room 72 is surrounded by the shielding cover 74. Thus, there arises a problem that the external noises cannot be effectively reduced. Additionally, the noises raising the problem in the external noises of the engine 70 have a relatively low frequency, around 1 KHz, and a large wavelength. These noises are hard to silence by the shielding cover 74 or a sound absorbing member attached to the cover 74. As a result, they are not absorbed by the shielding cover 74, but rather are reflected. Since these reflected noises additionally leak from the ventilating passage 75, there arises a problem that the external noises are more difficult to reduce.

On the other hand, the space around the engine room of the automobile is restricted, and it is desired to make the weight as small as possible. Therefore, the ventilable silencer device for the front grille of the automobile is required to be relatively light and thin in the ventilating direction and to have a wall shape sparing the space.

In Japanese patent application Kokai publication No. 8-177456, for example, there has been proposed a silencer which has an air resistance reduced at the ventilating time by arranging the Helmholtz type silencer in the partition portion around a partitioned air passage.

However, this silencer is troubled by a problem that the Helmholtz type silencer employed is a resonator for a single frequency, and therefore it is not suited for a wide band range. Against the noises, such as the engine noises, containing frequency components of the wide band range and having a substantially homogeneous acoustic pressure distribution around the radiator or in front of the vehicle, it is necessary to provide a silencer covering a plurality of frequencies.

Therefore, the independent air passages have to be individually provided with Helmholtz type resonators of different resonance frequencies or different shapes. As a result, the entire structure is complicated, raising a problem in that the manufacturing cost is raised.

In addition, the Helmholtz type resonance frequencies are determined depending upon many factors, including the sound velocity, the diameter of an introduction hole, the number of introduction holes, the thickness of the introduction hole portion, and the volume, thereby raising the problem that the design is complicated.

Here, if the Helmholtz type resonance frequency f is expressed for the sound velocity c, the diameter d of the introduction holes, the number k of introduction holes, the volume V, and the thickness tc of the introduction hole portions:

$$f=(c/2\pi)\times SQRT(C0/V),$$

wherein:

$$\beta=\pi/2;\text{ and}$$

$$C0=k\pi(2d)^2/(tc+\beta\times d/2).$$

In the case of the Helmholtz type resonance silencer, the structure is complicated and uses a large space so that it is hard to mount in a silencer device required to be thin for the front grille or the like. Moreover, the silencing frequency is single, so it is difficult to enhance the noise reducing effect over a wide band and against the engine noises.

Where the resonance silencer is employed in the front grille or like of the automobile, moreover, it cannot be monolithically molded by a molding method, such as an injection molding method using a synthetic resin or a metal. This requires a step of fixing the silencer, manufactured at a different step and suited for the frequency of noises to be silenced, on a passage wall, thereby raising the manufacturing cost.

In Japanese Patent Application No. 10-305306, on the other hand, we have proposed a silencer device 80 in which a branch passage 82 having a fixed sectional shape is arranged in parallel with a main passage 81 and in which an entrance opening 83 and an exit opening 84 of the branch passage 82 are opened in front of and at the back of the main passage 81, as shown in FIG. 15.

This silencer device is effective for the case in which the depth in the ventilating direction can be sufficient. Against the noises containing a low-frequency band, however, there arises a problem that the silencer device is hard to apply where the depth is restricted, as in the front grille of the automobile.

On the other hand, this silencer is characterized to silence both the sound waves of a fundamental frequency determined by the length of the silencing passage and the sound waves of a frequency which is the fundamental frequency multiplied by an integer. However, this silencer is troubled by a problem that its noise reducing effect is insufficient by any means against noises such as the engine noises covering a wide frequency band from a low frequency.

The present invention has been conceived to solve the above and/or other problems, and has an object to provide a silencer unit and a silencer device which can be applied to a portion such as the front grille or bumper of an automobile, and to not take up a large area in a ventilation front, or a large depth in a ventilating direction.

Another object of the present invention is to provide a ventilable silencer unit and a ventilable silencer device, which can not only reduce noises, such as the external noises of an engine over a relatively wide frequency band, but also retain the draft, such as cooling air into the engine room, sufficiently.

DISCLOSURE OF THE INVENTION

A ventilable silencer unit and a ventilable silencer device for achieving the objects described above are constructed in the following manners.

1) According to the present invention, there is provided a ventilable silencer unit comprising a box body including, a ventilation portion, a silencer portion adjacent to said ventilation portion and a dividing partition located between said ventilation portion and said silencer portion, said ventilation portion is formed of a ventilating passage opened through front end and back end of said box body.

said silencer portion being formed by closing front end and back end of said box body and including at least one partition plate to make a plurality of silencing passages of different length, each of said silencing passages communicating with said ventilation passage through at least one opening formed in said dividing partition, and, at least one of said silencing passages being provided with at least one passage extending partition to extend the length of said silencing passage.

These plural silencing passages are set in length to resonate with the sound waves of the target noises having a plurality of frequencies to be silenced, and are constructed to'attenuate those sound waves.

According to the present invention, the silencer is formed into the unit of the box body so that it can be arranged in the ventilating passage requiring the draft. Moreover, the silencer is provided with the plurality of silencing passages of different lengths and different resonance frequencies. Therefore, the number of frequencies of the sound to be silenced in the individual silencing passages is increased, so that the silencer can silence a remarkably wide frequency band as a whole, thereby improving the noise reducing efficiency drastically.

According to this construction, the silencer unit of the box body is provided with the plurality of silencing passages in the silencer portion of the box body and further with the partition plate and the passage extending partitions which are jointed to the box body or the dividing partition. Therefore, since the strength and rigidity of the silencer unit is raised, the silencer unit can be prevented from being deformed or broken, as might otherwise be accompanied by the vibrations or the like of the automobile.

Moreover, the partition walls of the ventilating passage are generally parallel to the ventilating direction so that they can retain a sufficient ventilating function without obstructing the draft.

2) In the ventilable silencer unit according to the present invention, said plurality of silencing passages are formed as resonance type silencing passage having two open ends.

If these resonance type silencing passages having two open ends are arranged, the silencer unit can have a plurality of resonance frequencies fan (=(nC)/(2La1)) containing the same fundamental frequency fa1 (=C/(2La1)) as that of the sound wave having a wavelength of λa1=2La1 twice as long as the passage length La1, so that it can silence the noises efficiently over a wide band containing the resonance frequency fan. Here, C designates the sound velocity, and n designates a natural number of 1, 2, 3, - - - , and so on.

Moreover, the resonance frequency fan to be erased depends on the passage length, but hardly on the sectional shape, so that the degree of freedom of the size of the silencing passages is enlarged to simplify the design and the manufacture.

Moreover, resonance type silencing passages having two open ends are partitioned with the passage extending partitions so that their length can be enlarged. Therefore, the silencer unit can be shortened in depth to reduce the thickness in the ventilating direction.

3) The ventilable silencer unit according to the present invention is constructed such that said plurality of silencing passages include a branch type silencing passage having only one open end.

If this branch type silencing passage having one open end is arranged, the silencer unit can have a plurality of resonance frequencies fbn (=(2n−1)C/(4L1)) containing the same fundamental frequency fb1 (=C/(4L1)) as the wavelength four times as long as a passage length Lb1. Therefore, the noises can be efficiently silenced over a wide band containing those resonance frequencies fbn.

Especially, the branch type silencing passage can have a shorter passage length and a lower fundamental frequency than in the resonance type silencing passage having two open ends so that it can have a high effect to reduce the noises in the low-frequency range.

4) The ventilable silencer unit thus constructed can be disposed in the ventilation portion of the front grille or bumper of an automobile.

The ventilable silencer unit according to the present invention is enabled to make its depth relatively short by its characteristics so that it can be arranged and effectively used in the relatively shallow ventilation portion of the front grille or bumper of the automobile.

In this case, the arrangement of the silencer unit in the front grille and the bumper can be made by changing the silencer unit sizes and the kinds.

5) And, one of said silencing passages has the length for silencing the sound wave having fundamental frequency of the noise at the engine idle driving time of said automobile.

Especially, the external noises of the automobile raise the problem when the automobile stops in an idle run so that they can be reduced more effectively by setting the passage length of the silencing passage according to their fundamental frequency in the idle run.

6) According to the present invention, a ventilable silencer device can be formed by jointing a plurality of ventilable silencer units.

These ventilable silencer units can be expanded to a wider area by jointing them with their open faces being in the same direction.

On the other hand, the fundamental frequencies of the individual silencing passages of those ventilable silencer units can be suitably selected by selecting the passage lengths. It is, therefore, possible to provide a silencer device having a higher silencing performance.

The silencer unit according to the present invention can be especially designed to have a short depth so that it can be assembled by jointing its upper and lower faces and its side wall plates to each other, as by assembling blocks.

Where the depth is sufficient in the mounted portion, moreover, the assembly can be made by connecting the silencer units in the longitudinal direction by jointing the rear wall plate and the front wall plate. Therefore, the silencer device can be formed by combining the units into shapes matching the individual mounting place.

If the several silencer units are assembled into the silencer device, the units can be handled altogether, so that they can be easily stored, transported and mounted.

7) The ventilable silencer device according to the present invention can be disposed in the ventilation portion of the front grille or bumper of an automobile.

The ventilable silencer device according to the present invention is disposed in the narrow introduction portion such as the ventilation portion of the front grille or bumper, i.e., the portion facing the engine room of the automobile. Then, this ventilable silencer device is high in the silencing efficiency over a wide frequency band from a relatively low frequency. Therefore, the frequency component in the relatively wide range of the wide-band external noises such as the engine noises to be radiated to the outside of the vehicle is silenced to reduce the external noises remarkably.

Therefore, the silencer device can be satisfactorily mounted on the vehicle. In addition, the ventilation is easily retained so that the cooling air of the engine is efficiently introduced into the engine room.

BEST MODE FOR CARRYING OUT THE INVENTION

The embodiments of the present invention will be described with reference to the accompanying drawings.

Figure 13:
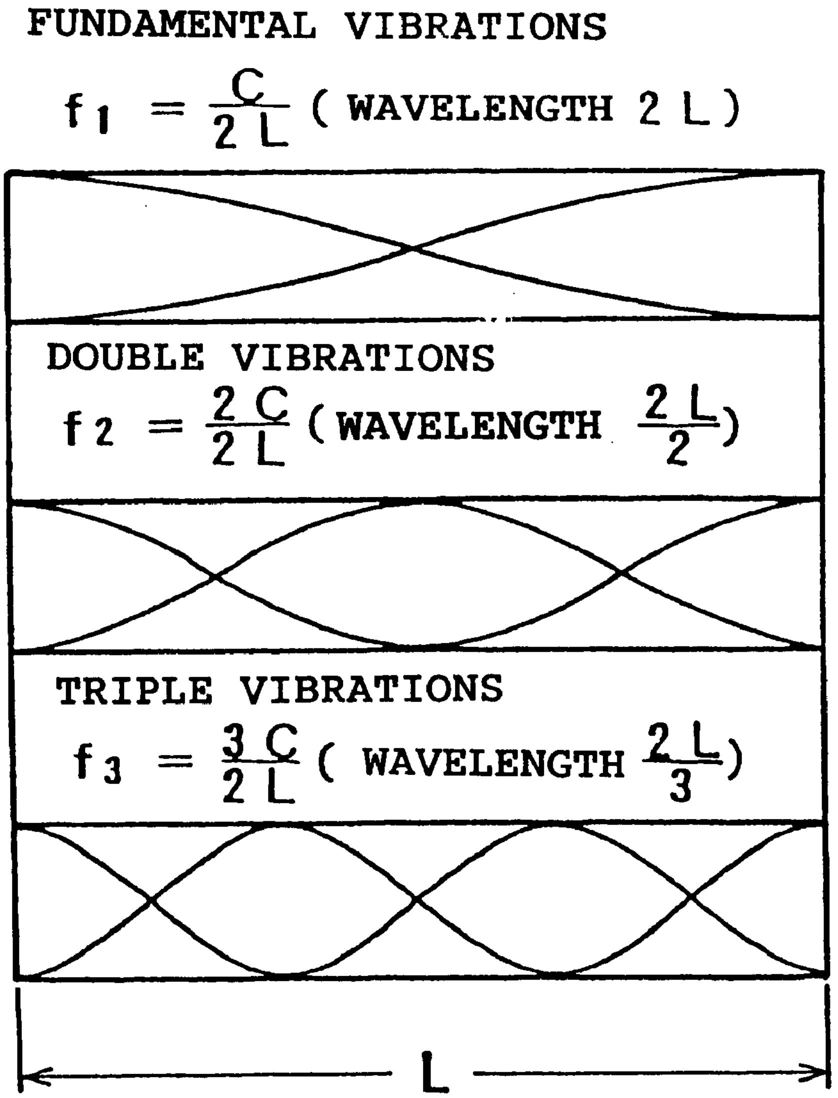
FIG. 13 is a schematic diagram for explaining the silencing principle of the silencer unit of the present invention.
Figure 14:
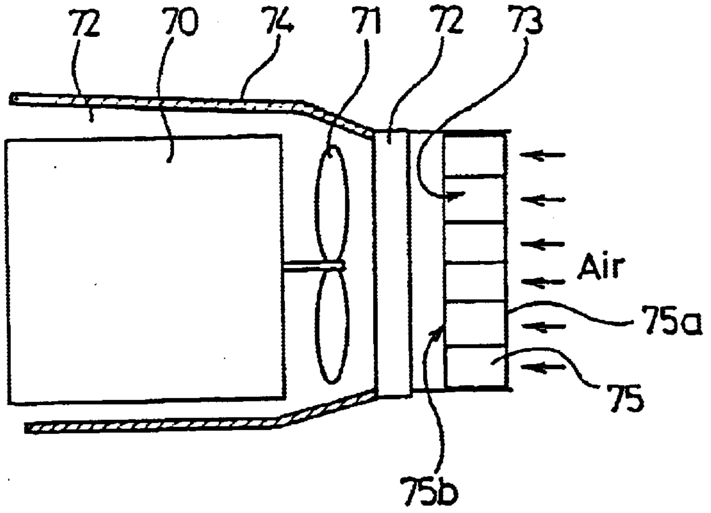
FIG. 14 is a schematic diagram showing a relation between the engine room and the front grille of an automobile.
Figure 15:
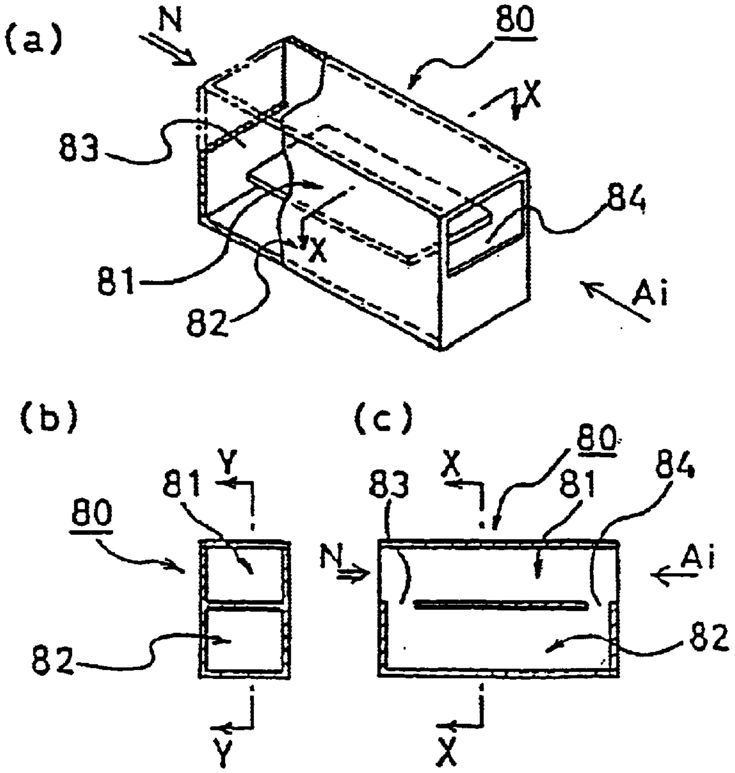
Fig. 15 (PRIOR ART)
FIG. 15 is a perspective view showing a silencer device of the prior art.

First of all, the silencing principle of the silencer unit of the present invention will be briefly described with reference to FIG. 13.

A standing wave is generated by resonances in a tube (or passage) opened at its two ends and having a length L, when acoustic vibrations are generated in the vicinity of the tube.

The standing wave is a sound wave satisfying the condition that the sound pressure is zero at the two ends of the tube. Therefore, the fundamental vibrations have a frequency in which the length L corresponds to one half of the wavelength, and a sound wave having a frequency of an integer times as long as the half wavelength so that they also exist as the standing wave.

In other words, when a sound wave passes in the vicinity of the tube having the length L and the two open ends, there is generated in the tube the standing wave of the sound waves having the frequency integer times as many as C/2L (wherein C: a sound velocity). Thus, the vibrational energy of the sound wave is converted into the standing wave to attenuate. On the other hand, the standing wave is converted into a thermal energy to attenuate.

This phenomenon is the silencing principle in the silencing passage having the two open ends in the present invention.

On the other hand, the silencer called the "branch type" is constructed of a tube (or passage) having one end opened and the other closed. In this tube, there is generated the standing wave which satisfies the condition that the sound pressure is zero at the open end and the maximum (to have a zero particle velocity) at the closed end. In greater detail, a sound wave having the fundamental frequency the quarter wavelength of which corresponds to the length L and a sound wave having a frequency as large as an odd-number time the fundamental frequency, each, is attenuated by resonance.

[First Embodiment]

Figure 1:
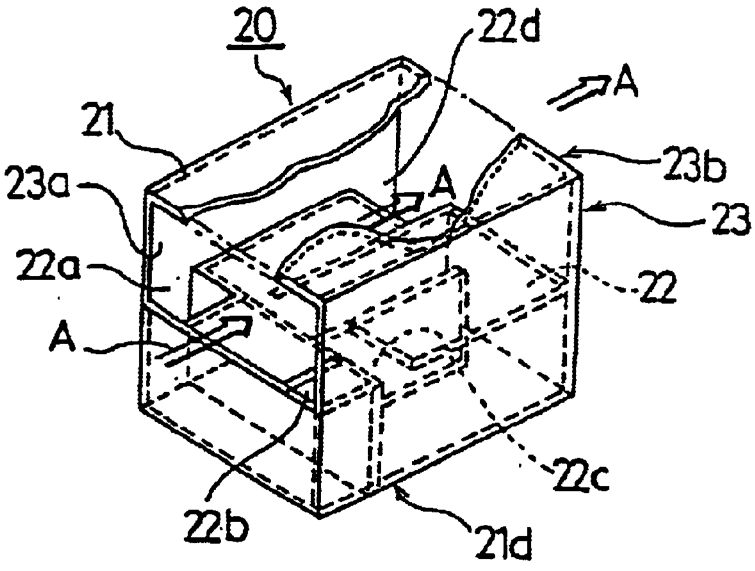
FIG. 1 is a schematic perspective view showing a ventilable silencer unit according to a first embodiment of the present invention.
Figure 2:
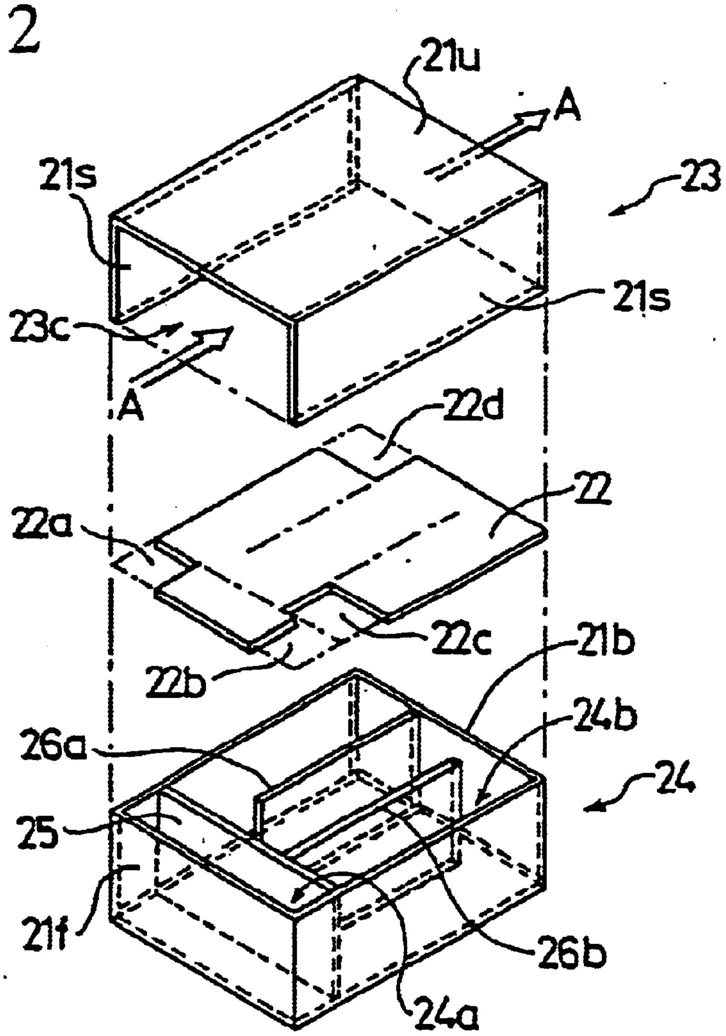
FIG. 2 is an exploded perspective view showing the inside of the ventilable silencer unit of FIG. 1.
Figure 3:
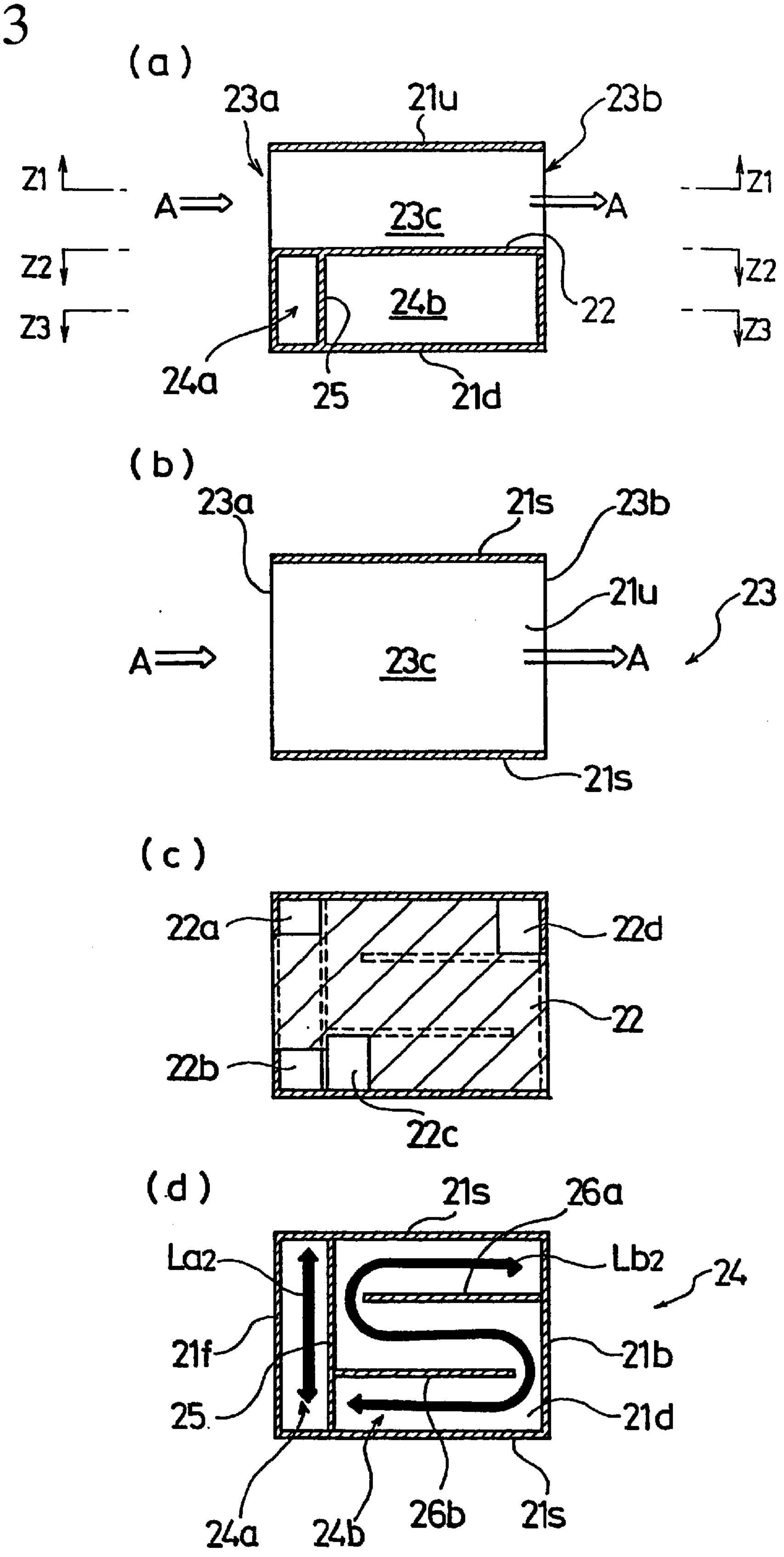
In FIG. 3 presenting diagrams showing the inside of the ventilable silencer unit of FIG. 1: (a) a sectional side elevation; (b) a section of Z1—Z1 of (a); (c) a section of Z2—Z2 of (a); and (d) a section of Z3—Z3 of (a).

A silencer unit 20 of the first embodiment of the present invention, as shown in FIG. 1 to FIG. 3, is formed to include a box body 21, and a dividing partition 22 parallel to the upper face 21*u* and the lower face 21*d* of the box body 21. This dividing partition 22 divides the box body 21 into a ventilation portion 23 and a silencer portion 24.

Specifically, the silencer unit 20 is formed of the box body 21 including the ventilation portion 23 for introducing the air from the front face of the front grille of an automobile into the engine room, for example, and the silencer portion 24 adjacent to the ventilation portion 23 through the dividing partition 22.

This ventilation portion 23 is provided with openings 23*a* and 23*b* in front of and at the back of the box body 21, and a ventilable ventilating passage 23*c* enclosed by the side wall plates 21*s* and 21*s* and the upper face 21*u* of the box body 21.

By the provision of this ventilating passage 23*c*, it is possible to retain a sufficient ventilation function. By adjusting the ratio between the sectional area of the ventilation portion 23 and the sectional area of the silencer portion 24, moreover, it is possible to easily adjust the balance between the ventilating function and the silencing function.

The silencer portion 24 is formed by closing the box body 21 in the longitudinal direction with a front wall plate 21*f* and a rear wall plate 21*b*, and by forming a plurality of silencer passages 24*a* and 24*b* having different passage lengths La2 and Lb2 with a partition plate 25.

On the other hand, the dividing partition 22 is provided with openings 22*a* to 22*d* to form the opening ends of the silencing passages 24*a* and 24*b* into the ventilating passage 23*c* thereby to form the resonance type silencing passages 24*a* and 24*b* having two open ends. Here, the opening 22*b* and 22*c* are the substantially continuous notches of the dividing partition 22.

Moreover, the silencing passage 24*b* is provided with passage extending partitions 26*a* and 26*b* so that the passage length Lb2 may be enlarged to lower the fundamental frequency of the resonant sound waves of the silencing passage 24*b* (FIG. 2).

Of these passage extending partitions 26*a* and 26*b* reaching the dividing partition 22 from the lower face 21*d*, the passage extending partition 26*a* is formed to have an opening on the front side, and the passage extending partition 26*b* is formed to have an opening on the rear side. As a result, the silencing passage 24*b* of the passage length Lb2 is formed between the opening 22*c* and the opening 22*d*.

With this structure, the silencer unit 20 is constructed to have the ventilating passage 23*c* and the resonance type silencing passages 24*a* and 24*b* having two open ends.

[Second Embodiment]

Here will be described a silencer unit 30 according to a second embodiment with reference to FIG. 4 to FIG. 6. However, the construction of a ventilation portion 33 is the same as that of the first embodiment so that its description will be omitted. The description will be made on a different portion, i.e., a silencer portion 34.

Figure 4:
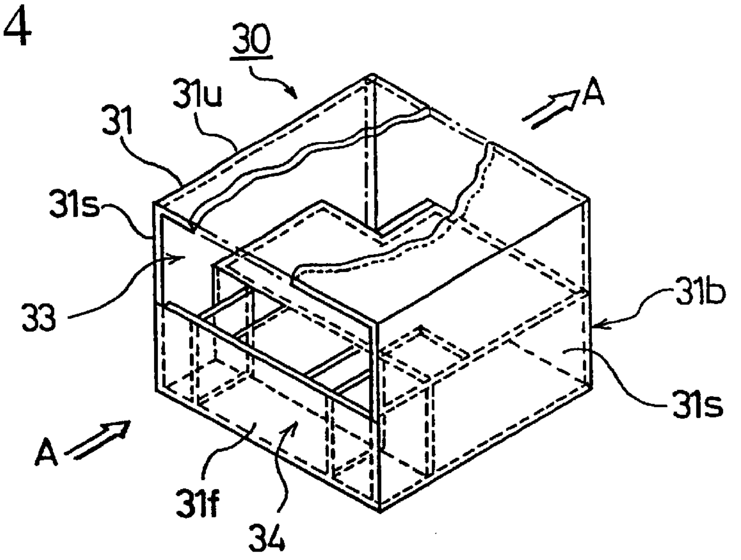
FIG. 4 is a schematic perspective view showing a ventilable silencer unit according to a second embodiment of the present invention.
Figure 5:
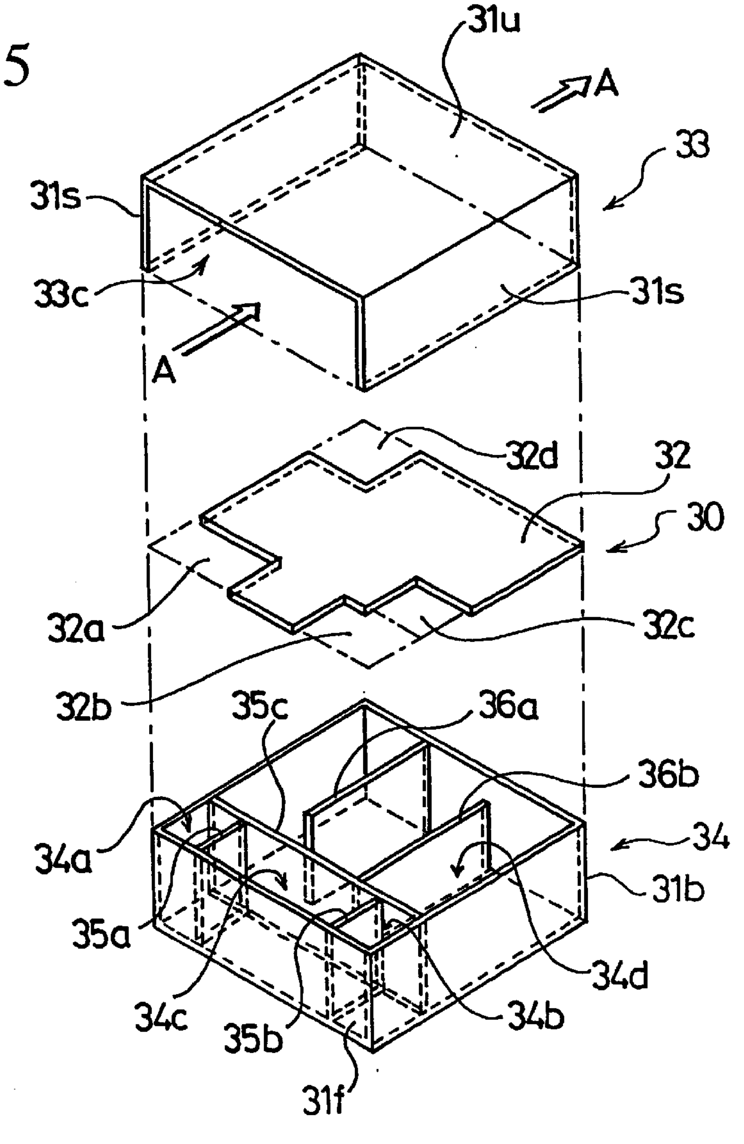
FIG. 5 is an exploded perspective view showing the inside of the ventilable silencer unit of FIG. 4.
Figure 6:
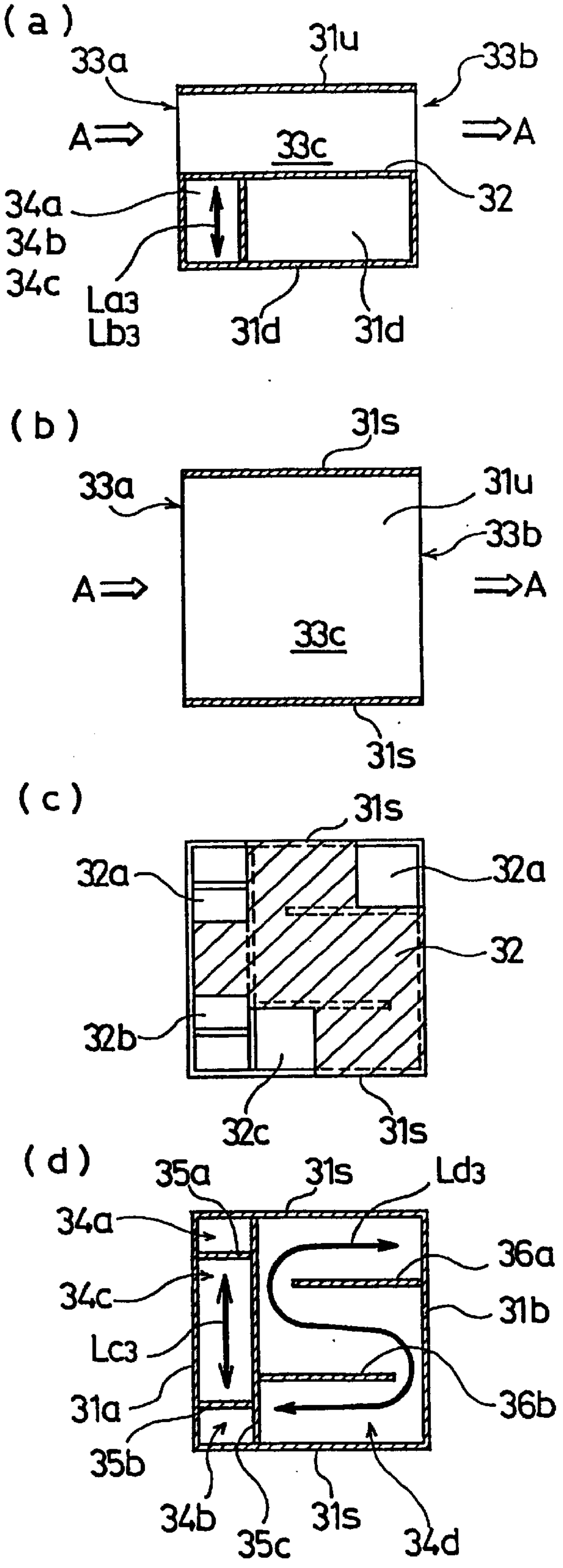
In FIG. 6 presenting diagrams showing the inside of the ventilable silencer unit of FIG. 4: (a) a sectional side elevation; (b) a section of Z1—Z1 of (a); (c) a section of Z2—Z2 of (a); and (d) a section of Z3—Z3 of (a).

The silencer portion 34 of the silencer unit 30 of the second embodiment of the present invention, as shown in FIG. 4 to FIG. 6, is formed by closing a box body 31 in the longitudinal direction with a front wall plate 31*f* and a rear wall plate 31*b*, and by forming a plurality of silencer passages 34*a* to 34*d* having different passage lengths La3, Lb3 and Lc3 with a plurality of partition plates 35*a*, 35*b* and 35*c*.

Moreover, these silencing passages 34*a* to 34*d* are made to communicate with a ventilating passage 33*c* by openings 32*a* to 32*d* formed in a dividing partition 32. As a result, there are formed the branch type silencing passages 34*a* and 34*b* each having only one open end and the resonance type silencing passages 34*c* and 34*d* each having two open ends.

Moreover, the silencing passage 34*d* is provided with passage extending partitions 36*a* and 36*b* to enlarge a passage length Ld3 thereby to lower the fundamental frequency of the resonant sound waves of the silencing passage 34*d*.

With this structure, this silencer unit 30 is constructed to have the ventilating passage 33*c*, the branch type silencing passages 34*a* and 34*b* each having only one open end, and the resonance type silencing passages 34*c* and 34*d* each having two open ends.

[Third Embodiment]

Here will be described a silencer unit 40 according to a third embodiment with reference to FIG. 7 to FIG. 9. However, the construction of a ventilation portion 43 is the same as that of the first embodiment so that its description will be omitted. The description will be made on a different portion, i.e., a silencer portion 44.

Figure 7:
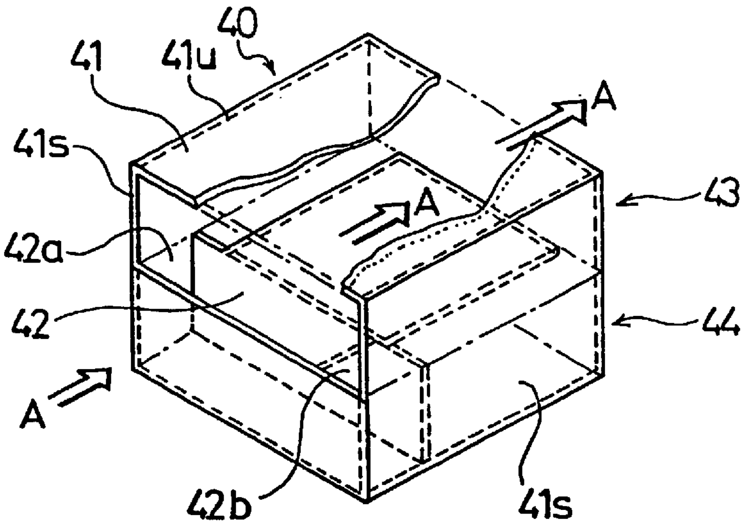
FIG. 7 is a schematic perspective view showing a ventilable silencer unit according to a third embodiment of the present invention.
Figure 8:
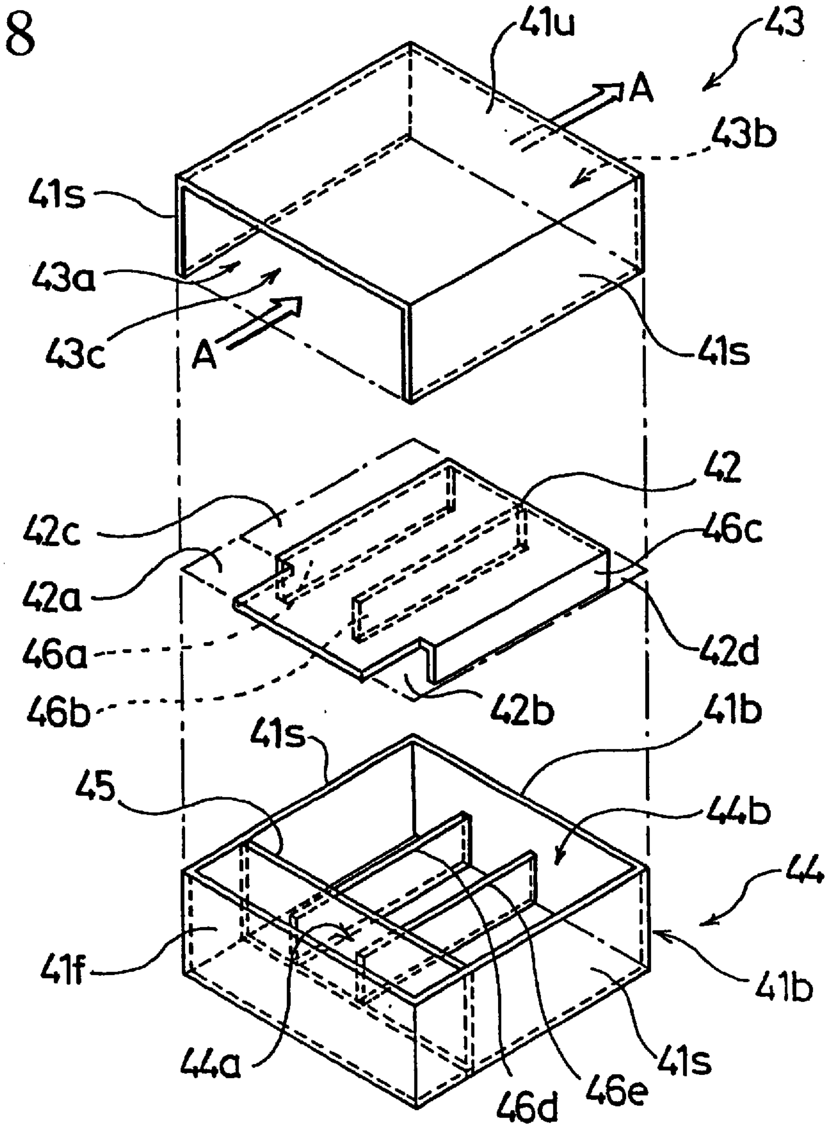
FIG. 8 is an exploded perspective view showing the inside of the ventilable silencer unit of FIG. 7.
Figure 9:
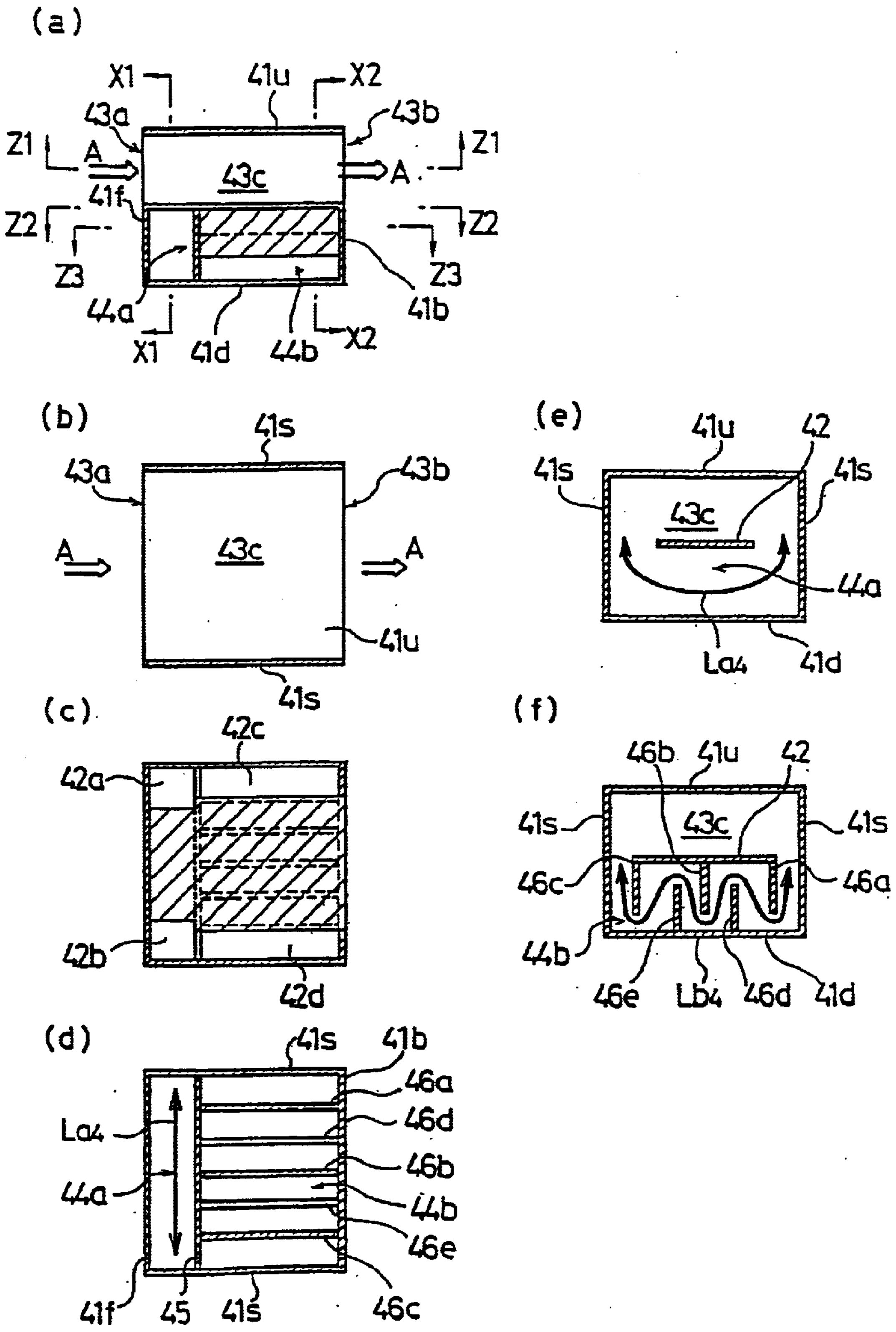
In FIG. 9 presenting diagrams showing the inside of the ventilable silencer unit of FIG. 7: (a) a sectional side elevation; (b) a section of Z1—Z1 of (a); (c) a section of Z2—Z2 of (a); (d) a section of Z3—Z3 of (a); (e) a section of X1—X1 of (a); and (f) a section of X2—X2 of (a).

The silencer portion 44 of the silencer unit 40 of the third embodiment of the present invention, as shown in FIG. 7 to FIG. 9, is formed by closing a box body 41 in the longitudinal direction with a front wall plate 41*f* and a rear wall plate 41*b*, and by forming a plurality of silencer passages 44*a* and 44*b* having different passage lengths La4 and Lb4 with a partition plate 45.

On the other hand, a dividing partition 42 is provided with openings 42*a* to 42*d* to form open ends of the silencing passages 44*a* and 44*b* into a ventilating passage 43*c* to form the resonance type silencing passages 44*a* and 44*b* having two open ends. Moreover, the silencing passage 44*b* is provided with passage extending partitions 46*a* to 46*e* to enlarge a passage length Lb4 thereby to lower the fundamental frequency of the resonant sound waves of the silencing passage 44*b*.

Of these passage extending partitions 46*a* to 46*e* reaching the rear wall plate 41*b* from the partition plate 45, the passage extending partitions 46*a*, 46*b* and 46*c* are opened downward, and the passage extending partitions 46*d* and 46*e* are opened upward. As a result, the silencing passage 44*b* of the passage length Lb4 is formed between the opening 42*c* and the opening 42*d*.

With this structure, this silencer unit 40 is constructed to have the ventilating passage 43*c* and the resonance type silencing passages 44*a* and 44*b* each having two open ends.

[Others]

The silencer units 20, 30 and 40 thus far described are determined in their sizes by the noise characteristics of the individual objects to be silenced, but are so constructed that their ventilating passages may be identical in heights to the grill opening when the units are applied to the front grille.

On the other hand, the resonance type silencing passages resonating with the frequency of 1 kHz and having two open ends have a passage length of 170 mm if the sound velocity is assumed to be 340 m/s.

Moreover, the ventilation portions 23, 33 and 43 and the silencer portions 24, 34 and 44 are determined in their size ratios by the balance between the drafts and the silencing performances. In FIG. 1 to FIG. 9, those portions are exemplified to have identical sizes, but the present invention should not be limited thereto.

Additionally, these silencer units can be made of various materials such as synthetic resins or light metals. Moreover, sound absorbing materials such as urethane or glass wool can be mounted considering the sound absorbing efficiency, the ventilation effects and so on.

Where this sound absorbing material is mounted, it has a sound absorbing effect for a higher frequency than that to be silenced by the sound absorbing material in the silencing passages so that a wider frequency band can be silenced.

Here, the ventilating direction is illustratively indicated by arrow A, but may be the reverse of that of arrow A. In short, the mounting has no directivity.

The silencer unit is formed into the box shape so that it can be used by itself. However, several kinds of silencer units can be massively manufactured and arranged by selecting its number and the kind of the silencer unit suitable according to the noise characteristics of the object to be silenced or the mounting place thereby to effect remarkably efficient silencing operations.

[Silencer Device]

Moreover, a silencer device having a ventilable wide area can be formed by coupling those silencer units.

Figure 10:
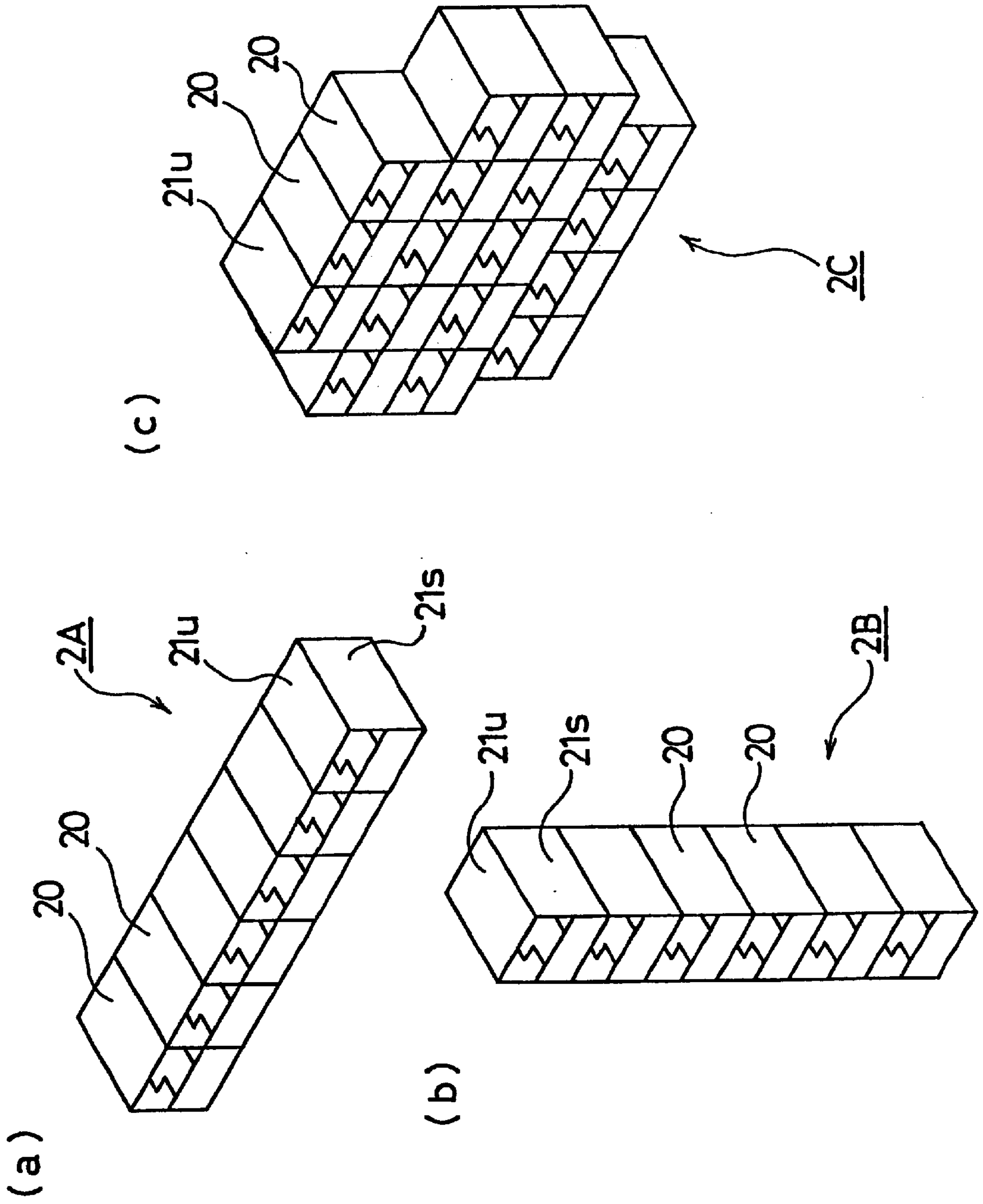
In FIG. 10 presenting diagrams showing ventilable silencer devices formed by combining ventilable silencer units: (a) a ventilable silencer device having a horizontally long shape; (b) a ventilable silencer device having a vertically long shape; and (c) a ventilable silencer device having a planar shape.

These silencer devices 2A, 2B and 2C are formed into a horizontally long shape, a vertically long shape or a planar shape suited for the mounting place, as shown in FIG. 10, by jointing the side wall plates 21*s* of the silencer units 20 or by jointing the upper and lower faces 21*u* and 21*d*. Here, FIG. 13 is exemplified by jointing not only the silencer units 20 of FIG. 4 but also the individual silencer units 30 and 40, and various kinds of silencer units may be combined to construct the silencer device.

If the silencer units 20, 30 and 40 are combined to construct the silencer devices 2A, 2B and 2*c*, many silencer units can be handled altogether to facilitate their storing, transporting and mounting operations.

Therefore, although the ventilation portion of the front grille or the bumper of the automobile may have a relatively horizontally long shape, the external noises can be effectively reduced by arranging the silencer device as having a plurality of silencer units jointed to one another.

Figure 11:
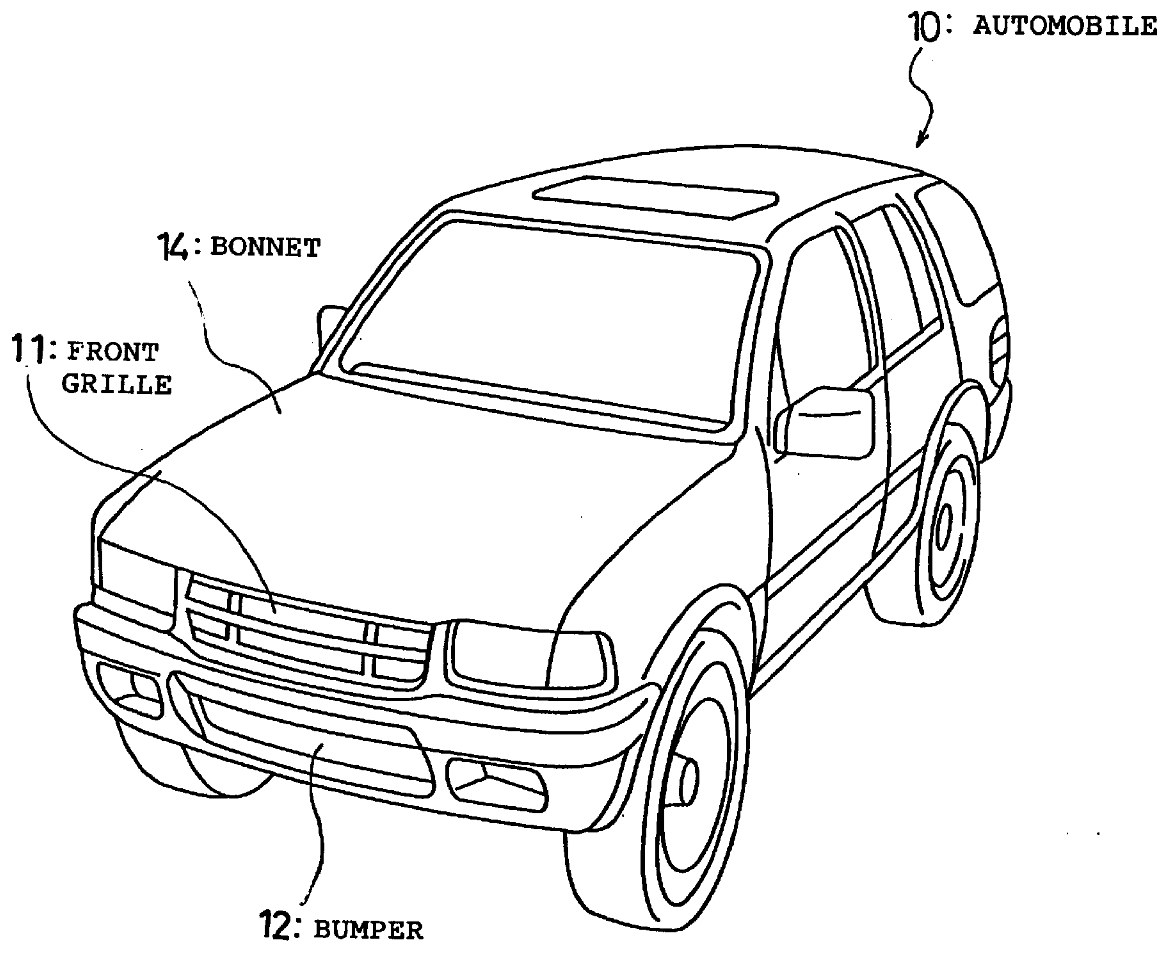
FIG. 11 is a perspective view of an automobile and shows one example of a grille and a bumper, in which the ventilable silencer device of the present invention is arranged.
Figure 12:
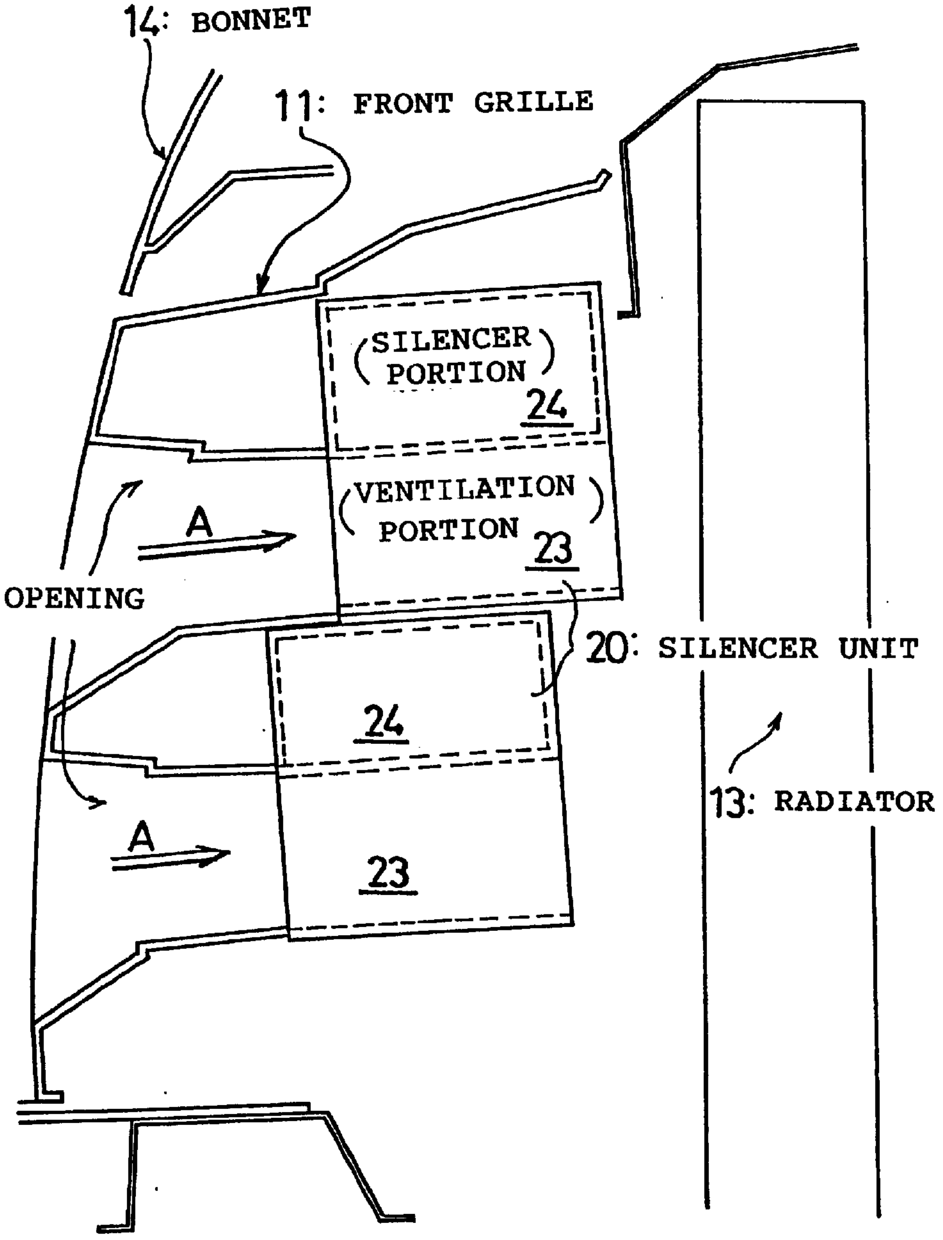
FIG. 12 is a sectional side elevation of a grille portion and shows an example in which a ventilable silencer device of the present invention is arranged in the grille of the automobile.

The silencer unit of the present invention can be arranged in the ventilation portion of a front grille 11 or a bumper 12 of an automobile 10 of FIG. 11. FIG. 12 shows an example of the case, in which the silencer unit is arranged in the front grille 11. In this example, the silencer unit 20 is arranged in two upper and lower stages with its ventilation portion 23 being adjusted to the opening of the front grille 11 formed below a bonnet 14. Here, the silencer unit 20 is so mounted with its ventilation portion 23 being below the silencer portion 24 that neither water nor dust may be accumulated in the silencer portion 24.

From the opening of the front grille 11, there is introduced a cooling wind, which flows through the ventilation portion 23 of the silencer unit 20 to a radiator 13 thereby to cool a hot fluid such as the engine cooling water in the radiator 13. The noises such as the engine noises to leak to the outside through the opening of the front grille 11 are effectively silenced while passing through the silencer unit 20 by the silencer portion 24 so that the external noises are drastically reduced.

The silencer unit of the present invention has been specifically described mainly on the case in which it is applied to the ventilation portion of the front grille of the automobile, but it is needless to say that the silencer unit of the present invention should not be limited to the application to the automobile. It is apparent that the silencer unit can be disposed in the air intake or exhaust ports of devices or facilities needed to have the ventilating function thereby to reduce the noises, or that the silencer unit is disposed in the conduits of ventilation/air-conditioning apparatus thereby to reduce the fan noises.

Industrial Applicablilty

According to the ventilable silencer unit of the present invention, as has been described hereinbefore, the following effects can be achieved.

1. The ventilating passages are formed of the side wall plates and the upper face so that they can retain the sufficient ventilating function without interfering with the ventilation. By adjusting the ratio between the sectional area of the ventilation portion and the sectional area of the silencer portion, moreover, the balance between the ventilating function and the silencing function can be simply adjusted to find the various applications.

With a plurality of silencing passages being formed of the branch type silencing passage having only one open end and the resonance type silencing passage having two open ends, moreover, the structure has a plurality of silencing fundamental frequencies so that the noises of a remarkably wide range can be efficiently silenced to have a high noise reducing effect.

2. With the passage extending partitions being disposed in those silencing passages, the silencing passages can be elongated to lower the silencing frequency without deepening the silencer unit thereby to provide a compact device capable of reducing the noises in the low-frequency range.

3. The silencing passages are formed of the branch type silencing passage or the resonance type silencing passage having two open ends so that they can be easily designed to the desired silencing frequency, because the resonance frequency to be silenced is related mainly to the passage length. Moreover, the degree of freedom of the sizes is so high that the silencing passages can be relatively simply designed to simplify the structure. Therefore, it is possible to lower the manufacture cost.

4. In the silencer portion where a plurality of silencing passages are formed, there are present a number of partitions and passage extending partitions which are jointed to the box body or the dividing partition. Therefore, since the strength and rigidity of the silencer unit can be increased, it is possible to prevent the silencer unit from being deformed or broken, as might otherwise be invited by the vibrations or the like of the automobile.

5. This ventilable silencer unit is made thin in the ventilating direction so that silencer units can also be arranged in a longitudinally thin wall shape by collecting them. The front grille or bumper of the automobile can be given the silencing function by arranging the silencer unit therein.

Moreover, the following effects can be achieved according to the ventilable silencer device in which the silencer units thus constructed are jointed.

1) The silencer device can be simply manufactured at a low cost because it is formed by jointing the silencer units having the simple structure and capable of silencing the frequency of a wide range.

2) Moreover, different kinds of silencer units having various silencing characteristics can also be easily combined. It is, therefore, possible to provide a silencer device which can change the silencing characteristics simply according to the manner to combine the silencer units thereby to cope with the various noises with a high silencing performance.

3) Moreover, the depth in the ventilating direction can be small, and the cooling air into the engine can be efficiently introduced into the engine room. Therefore, the ventilable silencer device can be properly arranged in the front grille or bumper of the automobile.

What is claimed is:

1. A ventilable silencer unit comprising:

a box body comprising a ventilation portion, a silencer portion adjacent to said ventilation portion, and a dividing partition located between said ventilation portion and said silencer portion;

said ventilation portion is formed of a ventilating passage opened through a front end and a back end of said box body;

said silencer portion being formed by closing the front end and the back end of said box body and comprising at least one partition plate to make a plurality of silencing passages of different length;

each of said silencing passages communicating with said ventilation passage through at least one opening formed in said dividing partition; and at least one of said silencing passages being provided with at least one passage extending partition to extend the length of said silencing passage.

2. A ventilable silencer unit as set forth in claim 1, wherein said plurality of silencing passages are formed as resonance type silencing passages having two open ends.

3. A ventilable silencer unit as set forth in claim 1, wherein said plurality of silencing passages comprise at least one branch type silencing passage having only one open end.

4. A ventilable silencer unit as set forth in claim 1, wherein said ventilable silencer unit is disposed in the ventilation portion of the front grille or bumper of an automobile.

5. A ventilable silencer unit as set forth in claim 4, characterized in that one of said silencing passages has the length for silencing the sound wave having fundamental frequency of the noise at the engine idle driving time of said automobile.

6. A ventilable silencer device characterized in that said ventilable silencer device is formed by jointing a plurality of ventilable silencer units as set forth in any of claims 1 to 3.

7. A ventilable silencer device as set forth in claim 6, characterized in that said ventilable silencer device is disposed in the ventilation portion of the front grille or bumper of an automobile.

8. A ventilable silencer unit as set forth in claim 1, wherein said plurality of silencing passages are comprised further of a combination of at least one resonance type silencing passage having two open ends, and at least one branch type silencing passage having only one open end.

9. A ventilable silencer unit as set forth in claim 1, wherein the passage extending partitions are jointed to the box body or the dividing partition.

10. A ventilable silencer unit as set forth in claim 1, further comprising sound absorbing materials mounted on said silencer unit, said sound absorbing materials absorbing higher frequencies than those absorbed by the silencing passages.

11. A ventilable silencer unit as set forth in claim 10, wherein said sound absorbing materials comprise at least one of urethane and glass wool.

* * * * *

UNITED STATES PATENT AND TRADEMARK OFFICE

CERTIFICATE OF CORRECTION

PATENT NO. : 6,719,078 B2
DATED : April 13, 2004
INVENTOR(S) : Masahiro Nakamura It is certified that error appears in the above-identified patent and that said Letters Patent is hereby corrected as shown below:

Column 11,
Line 15, please delete “any of claims 1 to 3” and insert -- claim 1 --.

Signed and Sealed this

Fourteenth Day of December, 2004

JON W. DUDAS
*Director of the United States Patent and Trademark Office*